United States Patent
Aiso (10) Patent No.: US 8,423,429 B2
(45) Date of Patent: Apr. 16, 2013

(54) METHOD, APPARATUS AND PROGRAM STORAGE DEVICE FOR PROVIDING AN ADVANCED MATERIAL MANAGEMENT CENTER

(75) Inventor: Kenichi Aiso, Sunnyvale, CA (US)

(73) Assignee: HGST Netherlands B.V., Amsterdam (NL)

( * ) Notice: Subject to any disclaimer, the term of this patent is extended or adjusted under 35 U.S.C. 154(b) by 1232 days.

(21) Appl. No.: 11/095,000

(22) Filed: Mar. 31, 2005

(65) Prior Publication Data

US 2006/0229756 A1    Oct. 12, 2006

(51) Int. Cl.
  *G06Q 10/00* (2006.01)
  *G06Q 20/00* (2006.01)
(52) U.S. Cl.
  USPC ............................................. 705/28; 705/22
(58) Field of Classification Search ........................ None
  See application file for complete search history.

(56) References Cited

U.S. PATENT DOCUMENTS

| | | | | |
|---|---|---|---|---|
| 5,237,496 A * | 8/1993 | Kagami et al. | 705/7.31 |
| 5,712,989 A * | 1/1998 | Johnson et al. | 705/28 |
| 5,819,232 A * | 10/1998 | Shipman | 705/7.24 |
| 5,930,771 A * | 7/1999 | Stapp | 705/28 |
| 5,946,662 A * | 8/1999 | Ettl et al. | 705/7.26 |
| 5,950,206 A * | 9/1999 | Krause | 1/1 |
| 6,002,344 A * | 12/1999 | Bandy et al. | 340/10.2 |
| 6,012,041 A * | 1/2000 | Brewer et al. | 705/28 |
| 6,026,378 A * | 2/2000 | Onozaki | 705/28 |
| 6,078,900 A * | 6/2000 | Ettl et al. | 705/28 |
| 6,341,271 B1 * | 1/2002 | Salvo et al. | 705/28 |
| 7,574,383 B1 * | 8/2009 | Parasnis et al. | 705/28 |

* cited by examiner

*Primary Examiner* — Mussa A Shaawat
(74) *Attorney, Agent, or Firm* — Merchant & Gould (57) ABSTRACT

A method, apparatus and program storage device for providing an advanced material management center is disclosed. A segregated delivery delay/component buffer area is maintained at a manufacturing site for holding material before transfer to the manufacturer. The content of the buffer area is owned by the supplier. Materials may be provided to the buffer area by a just-in-time warehouse or by a supplier. The quantity of any particular material at the buffer area is smaller than normally held at the just-in-time warehouse or provided by a supplier and therefore requires much less storage space. However, the buffer area provides quick availability to inventory and allows for improved maintenance and availability of inventory.

3 Claims, 6 Drawing Sheets

METHOD, APPARATUS AND PROGRAM STORAGE DEVICE FOR PROVIDING AN ADVANCED MATERIAL MANAGEMENT CENTER

BACKGROUND OF THE INVENTION

1. Field of the Invention

This invention relates in general to production inventory management, and more particularly to a method, apparatus and program storage device for providing an advanced material management center.

2. Description of Related Art

Supply chain planning comprises the logistical planning of a supply chain and is essential to the success of many of today's manufacturing firms. Most manufacturing firms rely on supply chain planning in some form to ensure the timely delivery of products in response to customer demands. Typically, supply chain planning is hierarchical in nature, extending from distribution and production planning driven by customer orders, to materials and capacity requirements planning, to shop floor scheduling, manufacturing execution, and deployment of products. The goal of supply chain planning is to ensure the smooth functioning of different aspects of production, from the ready supply of components to meet production demands to the timely transportation of finished goods from the factory to the customer.

Prior to the introduction of computerized scheduling systems, the scheduling of work orders in a manufacturing facility was performed manually. The person responsible for determining the work schedule manually assigned the work to be performed to specific dates. The manual scheduling process involved determining what work was to be performed and the time, materials, and resources required to perform it. However, this process was costly, very tedious and often inaccurate.

As commercial computer systems became available, manufacturers began using computerized systems that assisted in the storage and retrieval of information relevant to the scheduling of work and management of inventory in a manufacturing facility. Furthermore, today's modern supply chain often encompasses a vast array of data. Moreover, the planning applications that create and dynamically revise plans in the supply chain in response to changing demands and capacity require rapid access to data concerning the flow of materials through the supply chain.

Many types of manufacturing database management and inventory control systems exist today. Each of these systems views the process from the narrow viewpoint of the goals of such a system. For example, inventory control processes tend to determine when the inventory of an item is projected to be depleted and when to order goods to prevent such depletion. The inventory control process does not generally take into account the problems associated with availability of materials and machines to satisfy the inventory demand. On the other hand the manufacturing control process considers the availability problem but does not take into account the effect of a sales promotion that will deplete an inventory faster than projected. A marketing department in preparing a sales promotion will often not consider the effect that promotion will have on availability, inventory and profit margin but tends to focus on sales goals. What is needed is a system that will support managers with each of these viewpoints in understanding the effect of the various decisions that can be made on the supply chain as a whole both currently and into the near future.

Requisitioning systems that manage and process purchase orders are well known in the art. Such systems generally process purchase orders for items and track a local inventory. These systems employ essentially one-way communications between a terminal or local computer and a host computer to initiate purchase orders; the systems may also manage a local inventory.

Such systems do not, however, provide the capability for effectively managing a Just-In-Time (JIT) inventory site. In supply chain management, one goal is to have real time reaction up and down the supply chain. For example, many industries have moved to just-in-time models to supply parts to assembly line positions and warehouse inventories. Many businesses and organizations are seeking to implement JIT inventory stockrooms to make the most efficient use of available space and manpower, while at the same time avoiding costly delays caused by waiting for out of stock items. Supplier and customer organizations will sometimes agree that the supplier will retain ownership of the inventory at the JIT site, which is reserved for subsequent sale to that customer. Other times, they will agree that the customer will own the inventory at the JIT site, but that it will continue to be managed and replenished by the supplier.

Just-in-time supply models are cost efficient because they keep inventory low and allow quick reaction by the manufacturers to configuration changes. These same manufacturers, however, must constantly adjust the supply chain to ensure that no valuable production time is lost because an assembly line runs out of a necessary part. At the same time, customers have become more demanding and frequently demand an accurate promised delivery date of an ordered product.

However, the demands of JIT inventory management are not well met by current requisition and inventory management systems. For example, a JIT warehouse may be implemented proximate a manufacturing site, i.e., within blocks or a few miles of the manufacturing site. As mentioned, the JIT warehouse stores components needed during the manufacture of products and is usually managed by a third party, e.g., a contractor or a parts supplier. For ease of identification of the inventory components, each component may be identified by title of the component supplier until the manufacturer needs the goods for production. Moreover, the JIT warehouse may be implemented as a plurality of warehouses.

Because the JIT warehouses are located near the manufacturing plant, inventory may be moved from the JIT warehouses to the manufacturing site quickly, e.g., by truck. However, a needed component may require delivery from the warehouse to manufacturing floor. Thus, some inventory can be maintained at the manufacturing plant to fill the gap between generation of a delivery request to the JIT warehouse and arrival of the requested component at the manufacturing plant. However, inspection of specific component needs to take place at the manufacturing plant, regardless of production input. Furthermore, movement from the JIT warehouse to the manufacturing plant is typically by a palette. Thus, some small components are delivered which exceed the input requirements at the manufacturing plant. Accordingly, efficient maintenance of the inventory stock at a minimum level is a challenge.

It can be seen then that there is a need for a method, apparatus and program storage device for providing an advanced material management center.

SUMMARY OF THE INVENTION

To overcome the limitations in the prior art described above, and to overcome other limitations that will become apparent upon reading and understanding the present specification, the present invention discloses a method, apparatus and program storage device for providing an advanced material management center.

The present invention solves the above-described problems by providing a segregated delivery delay/component buffer area that is maintained at a manufacturing site for holding material before transfer to the manufacturer. The content of the buffer area is owned by the supplier. Materials may be provided to the buffer area by a just-in-time warehouse or by a supplier. The quantity of any particular material at the buffer area is smaller than normally held at the just-in-time warehouse or provided by a supplier and therefore requires much less storage space. However, the buffer area provides quick availability to inventory and allows for improved maintenance and availability of inventory.

An advanced material management center in accordance with the principles of an embodiment of the present invention includes a buffer area, located at a manufacturing site, for receiving lots of materials for use in producing an end item, the lots of material at the buffer area being owned by at least one vendor, an inventory database, for identifying the lots of materials held in the storage area and a materials management system for receiving request for material needed during manufacturing of an end item, comparing the request to materials held in the storage area and identifying materials for issue in response to the request.

In another embodiment of the present invention, an advanced material management includes memory for storing data concerning inventory for manufacturing an end item and a processor, coupled to the memory, the processor configured for receiving requests for materials needed at a manufacturing line of a manufacturing site, issuing an order to transfer material from inventory in a storage area located at the manufacturing site to a manufacturing line inventory warehouse, for recording delivery of the transferred materials at the manufacturing line inventory warehouse and for transferring ownership of the transferred materials from a vendor to an owner of the manufacturing site.

In another embodiment of the present invention, a system for managing inventory for a manufacturing line is provided. The system includes a first warehouse located proximate to a manufacturing facility, the first warehouse receiving bulk materials from at least one supplier, the at least one supplier maintaining ownership of the bulk materials at the first warehouse, a second warehouse located at the manufacturing facility, the second warehouse receiving smaller lots of materials, wherein the smaller lots of materials are owned by the at least one supplier and a receiving area located at the manufacturing facility, the receiver area receiving from the second warehouse materials needed at the manufacturing line, wherein ownership of the materials received from the second warehouse is transferred to the owner of the manufacturing facility.

In another embodiment of the present invention, a method for managing material for a manufacturing line is provided. The method includes providing at a manufacturing site a buffer area for receiving lots of materials for use in producing an end item by a manufacturer, the lots of material at the buffer area being owned by at least one vendor providing an inventory database for identifying the lots of materials held in the buffer area and providing a manufacturing line inventory warehouse for holding inventory for the manufacturing line received from the buffer area, inventory at the manufacturing line inventory warehouse being under ownership of the manufacturer.

In another embodiment of the present invention, a method for providing an advanced material management center is provided. The method includes storing data concerning inventory for manufacturing an end item, receiving requests for materials need at a manufacturing line of a manufacturing site, transferring material owned by at least one vendor from inventory in a storage area located at the manufacturing site to a manufacturing line inventory warehouse and transferring ownership of the transferred materials from a vendor to an owner of the manufacturing site.

In another embodiment of the present invention, a method for managing inventory for a manufacturing line is provided. The method includes receiving bulk materials from at least one supplier at a first warehouse proximate to a manufacturing facility, the first warehouse, maintaining ownership of the bulk materials by the at least one supplier at the first warehouse, receiving smaller lots of materials owned by the at least one supplier at a second warehouse located at the manufacturing facility, receiving, at a receiving area located at the manufacturing facility, materials needed at the manufacturing line from the second warehouse and transferring ownership of the materials received from the second warehouse to the owner of the manufacturing facility.

In another embodiment of the present invention, a program storage device having program instructions executable by a processing device to perform operations for managing material for a manufacturing line is provided. The operations include providing at a manufacturing site a buffer area for receiving lots of materials for use in producing an end item by a manufacturer, the lots of material at the buffer area being owned by at least one vendor, providing an inventory database for identifying the lots of materials held in the buffer area and providing a manufacturing line inventory warehouse for holding inventory for the manufacturing line received from the buffer area, inventory at the manufacturing line inventory warehouse being under ownership of the manufacturer.

In another embodiment of the present invention, a program storage device having program instructions executable by a processing device to perform operations for providing an advanced material management center is provided. The operations include storing data concerning inventory for manufacturing an end item, receiving requests for materials need at a manufacturing line of a manufacturing site, transferring material owned by at least one vendor from inventory in a storage area located at the manufacturing site to a manufacturing line inventory warehouse and transferring ownership of the transferred materials from a vendor to an owner of the manufacturing site.

In another embodiment of the present invention, a program storage device having program instructions executable by a processing device to perform operations for managing inventory for a manufacturing line is provided. The operations include receiving bulk materials from at least one supplier at a first warehouse proximate to a manufacturing facility, the first warehouse, maintaining ownership of the bulk materials by the at least one supplier at the first warehouse, receiving smaller lots of materials owned by the at least one supplier at a second warehouse located at the manufacturing facility, receiving, at a receiving area located at the manufacturing facility, materials needed at the manufacturing line from the second warehouse and transferring ownership of the materials received from the second warehouse to the owner of the manufacturing facility.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for providing an advanced material management center. A segregated delivery delay/component buffer area is maintained at a manufacturing site for holding material before transfer to the manufacturer. The content of the buffer area is owned by the supplier. Materials may be provided to the buffer area by a just-in-time warehouse or by a supplier. The quantity of any particular material at the buffer area is smaller than normally held at the just-in-time warehouse or provided by a supplier and therefore requires much less storage space. However, the buffer area provides quick availability to inventory and allows for improved maintenance and availability of inventory.

Figure 1:
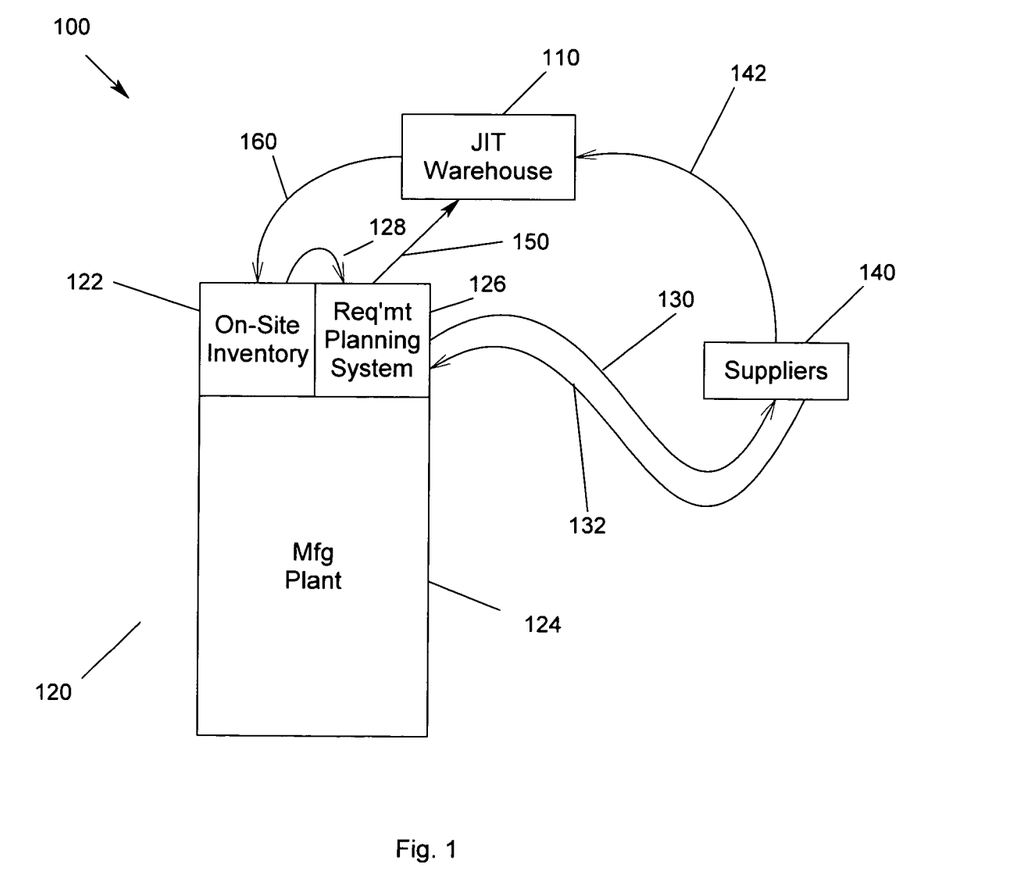
FIG. 1 illustrates a typical material management system.

FIG. 1 illustrates a typical material management system 100. A Just-In-Time (JIT) warehouse 110 is located outside of a manufacturing site 120. The JIT warehouse 110 is used to store, by title of the component, supplier components that are used in the manufacture of products of the manufacturer. The components in the JIT warehouse 110 are stored until the manufacturer needs the goods for production. The components are moved form the JIT warehouse 110 to a stock facility 122 at the manufacturing site 120 on pallets. The JIT warehouse 110 of FIG. 1 may actually include a plurality of JIT warehouses 110, which may or may not be located together. Components in the JIT warehouse 110 are typically delivered to the manufacturing site 120 by truck.

While the bulk of the components are typically stored at the JIT warehouse 110 until needed, some inventory is maintained in the stock facility 122 at the manufacturing site 120 to meet immediate needs for a component at the manufacturing plant 124. The inventory in the stock facility 122 at the manufacturing site 120 provides a safety buffer of inventory that fills the gap between the generation of a delivery request and arrival of the requested component at the manufacturing site 120.

When components are received at the manufacturing stock facility 122, inspections are performed. However, the number of small components that are delivered typically exceed the current input requirement. Because of lags in the material request, delivery and inspection, the method for maintaining the stock inventory at a minimum level needs to be improved.

A material requirement planning system 126 is used to plan for inventory control so that inventory is stocked at a minimum level. The material requirement planning system 126 creates parts requirement and purchase ordered that will be issued 130. Suppliers 140 then commit a delivery date for the requirement 132 and parts are delivered 142 to the JIT warehouse 110 using the supplier's title for the component. The parts will be kept at the JIT warehouse 110 by supplier's title until the manufacturer issues a pull signal 150 to the JIT warehouse 110, wherein the needed parts are then delivered 160 to the manufacturing stock facility 122. To arrange delivery and to reserve a truck for the delivery of the requested components, the pull signal 150 has to be submitted to the JIT warehouse 110 at the end of the day prior to the desired delivery date. The JIT warehouse 110 arranges the truck for the next day and parts will be moved by palette to the manufacturing stock facility 122 at the manufacturing site 120. Ownership of the inventory does not shift to the manufacturer until delivery of parts to the manufacturing stock facility 122 at the manufacturing site 120 and the delivery is recorded 128 in the material requirement planning system 126.

Figure 2:
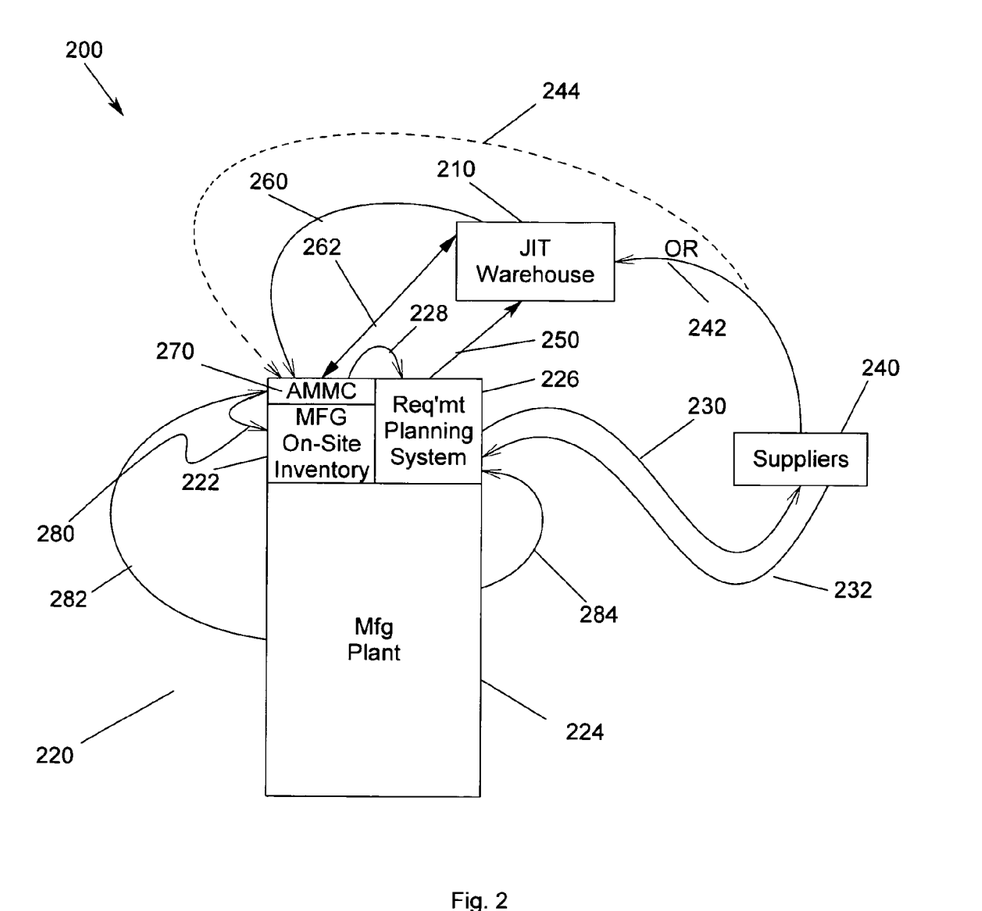
FIG. 2 illustrates a material management system 200 according to an embodiment of the present invention.

FIG. 2 illustrates a material management system 200 according to an embodiment of the present invention. In FIG. 2, a material planning system 226 creates parts requirement and purchase orders 230 that will be issued to suppliers 240. The suppliers commit a delivery date for the requirement 232 and parts are delivered 242 to the JIT warehouse 210 and identified according to the title in the supplier's inventory. Alternatively, suppliers may deliver 244 parts to a buffer of an advanced material management center (AMMC) 270 at the manufacturing plant 224. The buffer of the AMMC 270 is located at the manufacturing site 220 proximate the manufacturing line inventory warehouse 222. The components in the buffer of the AMMC 270 are owned and may be maintained by a third party or by the suppliers 240.

Parts requirements are monitored by the JIT warehouse 210 via queries 262 to the AMMC 270 and therefore may be pushed 260 to the buffer of the AMMC 270 at the manufacturing site 220 without the JIT warehouse 210 receiving a pull signal 250. Nevertheless, the materials may also be pulled to the buffer of the AMMC 270 via a pull signal 250. Parts are stored according to the supplier's title at the buffer of the AMMC 270 at the manufacturing site 220. The inventory at the buffer of the AMMC 270 is separated from the manufacturer owned inventory at the manufacturing line inventory warehouse 222 until transferred 280, e.g., after a parts request is issued. The manufacturer sends parts issue request 282 to the party maintaining the buffer of the AMMC 270. The party maintaining the buffer of the AMMC 270 issues 280 parts from the buffer of the AMMC 270. The components may be thus be provided 280 to manufacturing line inventory warehouse 222 in much more smaller quantities than previously delivered at the manufacturing site 220 from the JIT warehouse 210. The manufacturer confirms receipt and provides recordation 284 to the material requirement planning system 226. Inventory ownership is then transferred from the supplier 240 to the owner of the manufacturer plant 224.

Figure 3:
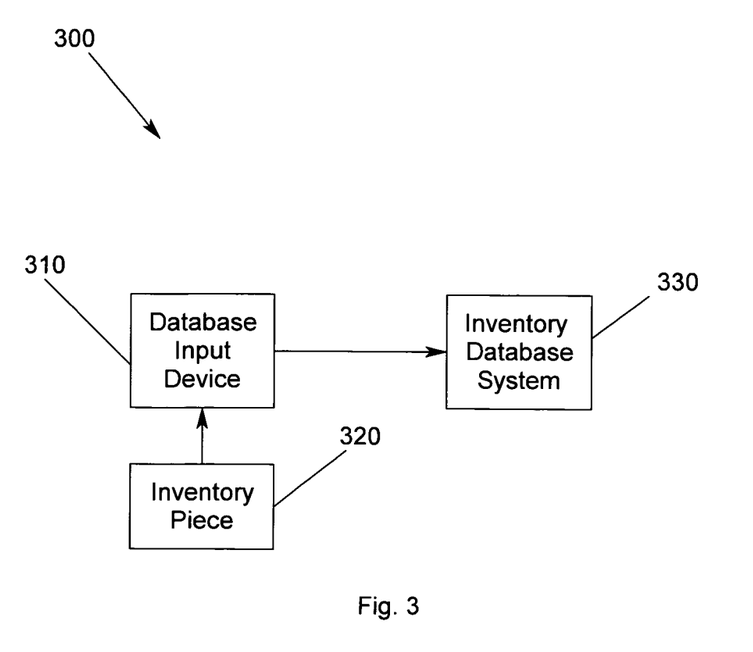
FIG. 3 illustrates an inventory database system 300 according to an embodiment of the present invention.

FIG. 3 illustrates an inventory database system 300 according to an embodiment of the present invention. In FIG. 3 a database input device 310 allows input concerning an inventory piece 320 to be provided to an inventory database 330. The database input device 310 may be a scanner, a computer and keyboard, RF reader or any other type of data entry device. The inventory piece 320 includes information therewith identifying the materials by name, manufacturer and quantity. For example, the inventory piece 320 may include a bar code, text, passive RF tag, or any other device for interfacing with the database input device 310. All data concerning the inventory piece 320 is provided to the inventory database 330 via the database input device 310.

Figure 4:
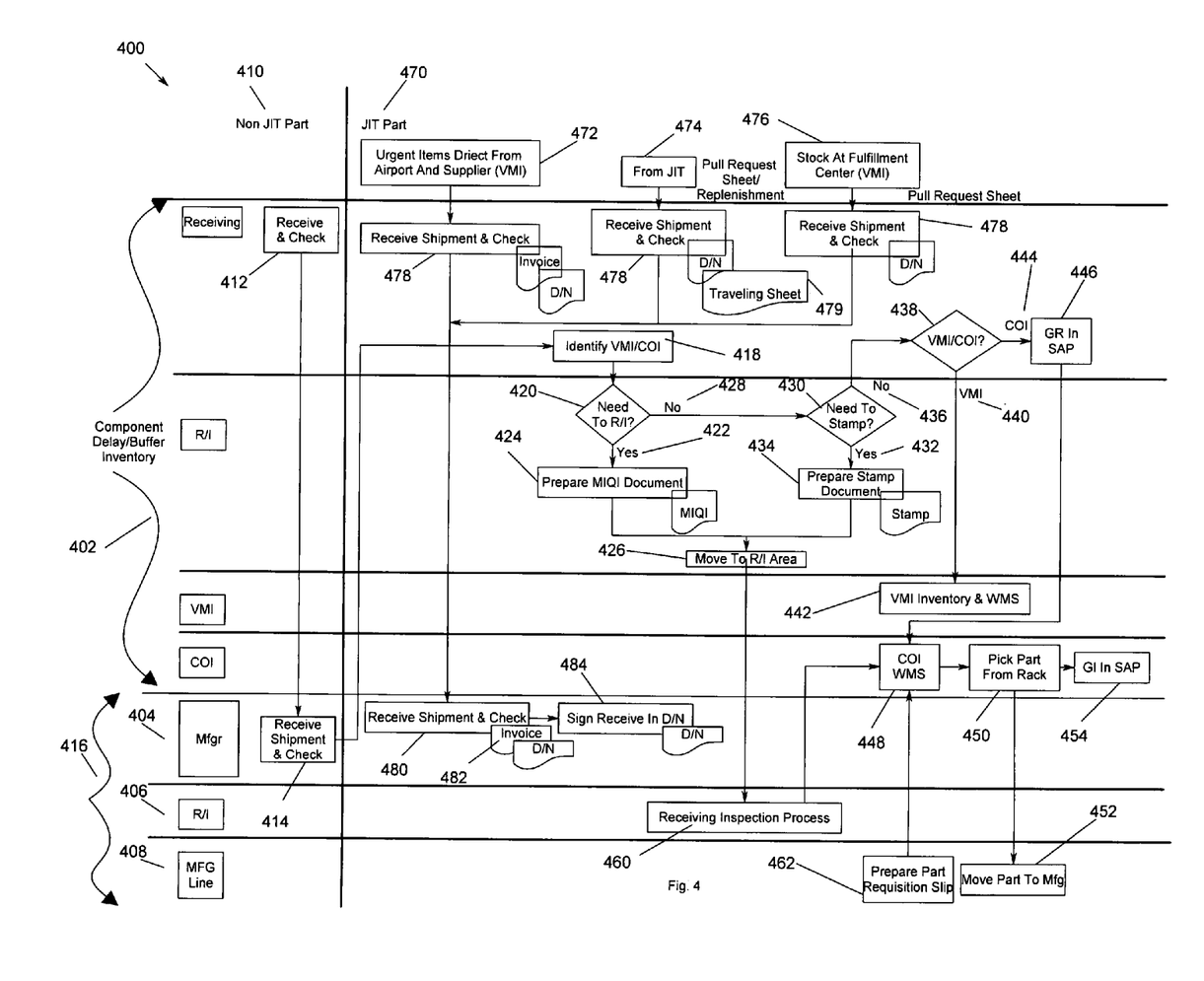
FIG. 4 is a detailed flow diagram of the material management operations 400 according to an embodiment of the present invention.

FIG. 4 is a detailed flow diagram of the material management operations 400 according to an embodiment of the present invention. In FIG. 4, the operations are separated into non-JIT parts 410 and JIT parts 470. Further, the processes are divided into third party inventory operations 402, manufacturer receipt operations 404, manufacturer inspection operations 406 and manufacturing line operations 408.

When a non-JIT component is received 410, the component is processed through normal receiving and check operations 412. The component is then checked 414 at the manufacturing site 416 and identified as vendor managed inventory or customer owned inventory 418. A determination is made whether the component is to be further inspected 420. If yes 422, the MIQI document is prepared 424 and the component is moved to the receiving and inspection area 426. If not 428, a determination is made whether to prepare a stamp document 430. If yes 432, the stamp document is prepared 434 and the component is moved to the receiving and inspection area 426. If not 436, a determination is made whether the component is vendor managed or customer owned 438. If vendor managed 440, the component is provided to the vendor-managed inventory and entered into the warehouse management system 442. If customer owned 444, a goods receipt is issued 446. The component is then moved to the customer owned inventory and entered into the warehouse management system 448. The warehouse management system allows a part to be picked from the rack 450. The part may then be moved to the manufacturing line 452 and a goods issued notification is produced 454. Components that are moved to the receiving and inspection area are inspected 460. The materials management and inventory planning system 448 may be provided input from the customer owned inventory in the warehouse management system. The customer owned inventory warehouse management system 448 also processes requisition slips 462.

The operations for processing JIT parts 470 may include three scenarios. First, urgent items may be received directly from the airport/supplier 472. Second, JIT parts may be provided from the JIT warehouse 474. Third, JIT parts may be provided from stock in the fulfillment center 476. Urgent items received directly from the airport/supplier are processed through receiving by checking the components and issuing an invoice 478. JIT parts provided from the JIT warehouse are also processed through receiving by checking the components 478. A traveling sheet is produced for the goods provided from the JIT warehouse 479. JIT parts may be provided from stock in the fulfillment center are also processed through receiving by checking the components 478. All JIT components are then provided to the manufacturer wherein they are again checked 480 and an invoice is generated 482. The receipt of the JIT components is also entered in the D/N 484.

Figure 5:
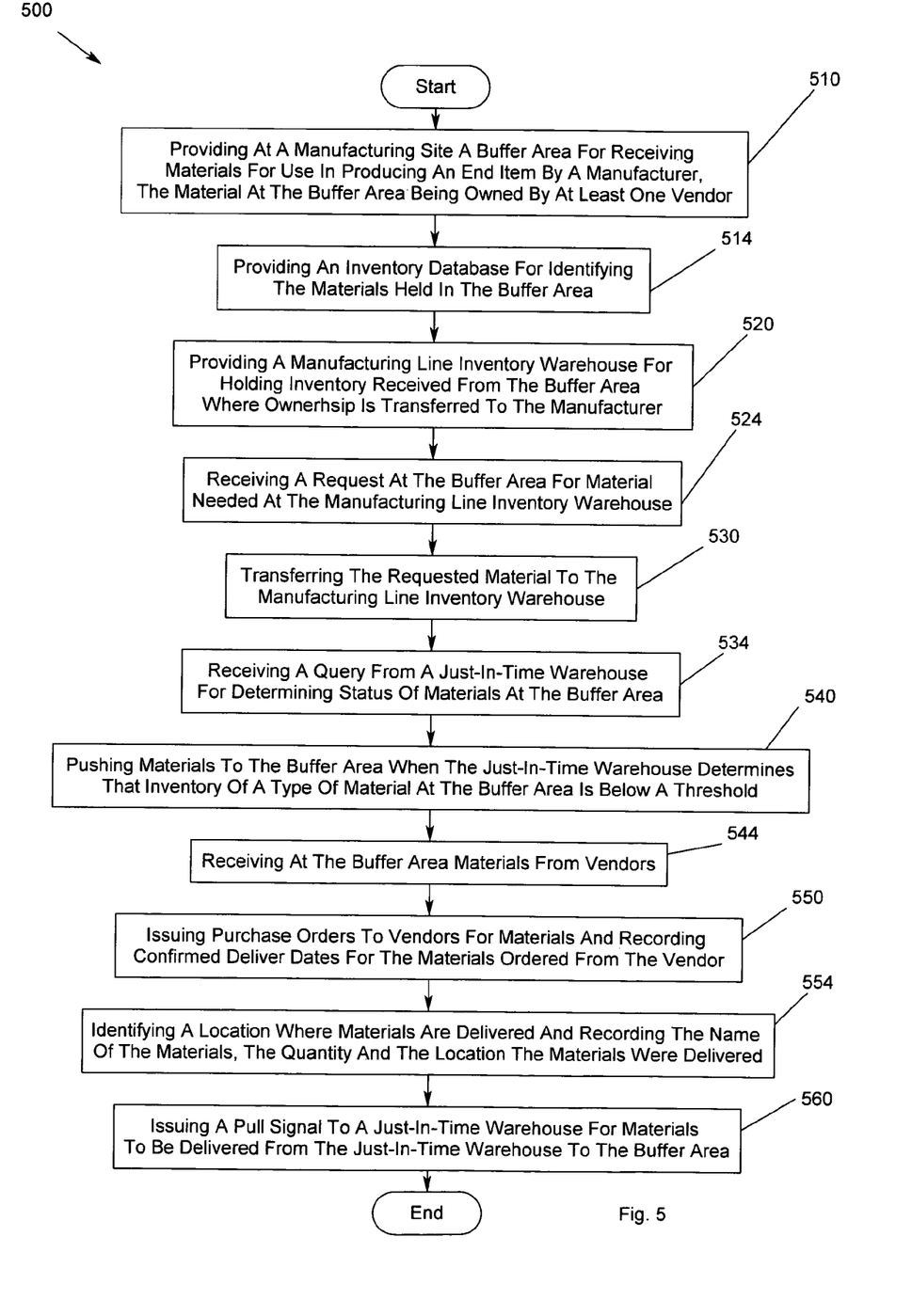
FIG. 5 is a flow chart of the operations for providing an advanced material management center according to an embodiment of the present invention.

FIG. 5 is a flow chart 500 of the operations for providing an advanced material management center according to an embodiment of the present invention. An advanced material management center (AMMC) provides a segregated delivery delay/component buffer area at a manufacturing site 510. The materials at the buffer area are used in producing an end item by a manufacturer, the lots of material at the buffer area being owned by at least one vendor. An inventory database is provided for identifying the lots of materials held in the buffer area 514. A manufacturing line inventory warehouse is provided for holding inventory for the manufacturing line received from the buffer area where ownership is transferred to the manufacturer 520. A request may be received at the buffer area for material needed at the manufacturing line inventory warehouse for manufacturing an end item 524. The requested material is transferred to the manufacturing line inventory warehouse 530. A query may be received from a just-in-time warehouse disposed at a location proximate to the manufacturing site for determining a status of materials at the buffer area 534. Materials are pushed to the buffer area when the just-in-time warehouse determines that inventory of a type of material at the buffer area is below a threshold 540. The buffer area may also receive materials from vendors 544. Purchase orders are issued to vendors for materials and delivery dates confirmations for the materials ordered from the vendor are recorded 550. A location where materials are delivered is identified and the name of the materials, the quantity and the location the materials were delivered is recorded in the database 554. When inventory is available from the just-in-time warehouse, a pull signal may be issued to the just-in-time warehouse located proximate to the manufacturing site to cause materials associated with the pull signal to be delivered from the just-in-time warehouse to the buffer area at the manufacturing site 560.

Figure 6:
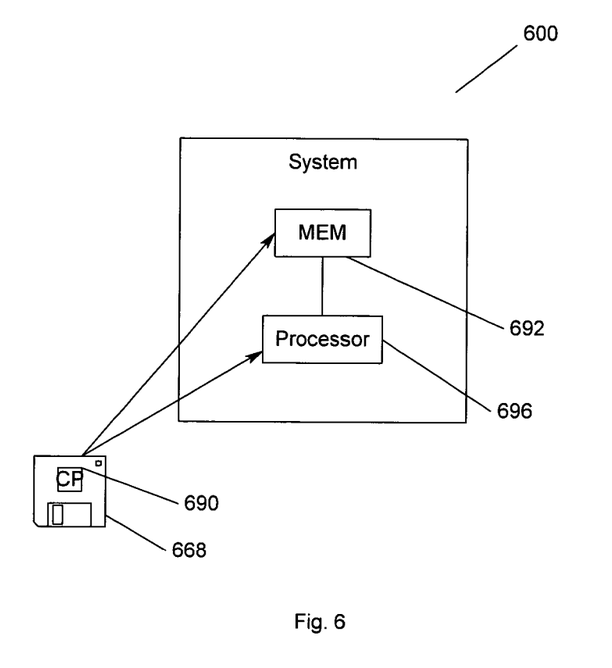
FIG. 6 illustrates a system wherein the process illustrated with reference to FIGS. 2-5 may be tangibly embodied in a computer-readable medium according to an embodiment of the present invention.

FIG. 6 illustrates a system 600 according to the present invention, wherein the process illustrated with reference to FIGS. 2-5 may be tangibly embodied in a computer-readable medium or carrier, e.g. one or more of the fixed and/or removable data storage devices 668 illustrated in FIG. 6, or other data storage or data communications devices. A computer program 690 expressing the processes embodied on the removable data storage devices 668 may be loaded into the memory 692 or into the processor 696 to configure the system 600 of FIG. 6, for execution. The computer program 690 comprise instructions which, when read and executed by the processor 696, causes the processor 696 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An advanced material management center, comprising:
a vendor site just-in-time (VJIT) warehouse disposed at a location proximate to but distinct from a manufacturing site, the VJIT maintaining materials owned by a vendor for provisioning to a manufacturer for production of an end item by the manufacturer;
a buffer area included at a manufacturing site just-in-time (MJIT) warehouse, located at a manufacturing site of a manufacturer, the buffer area holding only vendor-owned units of material transferred from the VJIT in quantities less than an aggregate number of units held by the vendor, the VJIT monitoring a quantity of vendor-owned units of material held by the buffer area and replenishing vendor-owned units of material upon detection by the VJIT of vendor-owned units of material held in the buffer area below a predetermined level;

a manufacturing line inventory warehouse disposed at the manufacturing site proximate to the buffer area, the manufacturing line inventory warehouse receiving vendor-owned units of material from the buffer area when the buffer area receives a parts issue request, ownership of the materials being transferred to the manufacturer after receipt by the manufacturing line inventory warehouse of the vendor-owned units of material from the buffer area;

an inventory database including data identifying the vendor-owned units of materials held in the buffer area at the MJIT warehouse of the manufacturing site; and a materials management system, coupled to the inventory database, including a processor and memory, the processor issuing the parts issue requests for vendor-owned material needed from the buffer area at the MJIT warehouse during manufacturing of the end item.

2. A method for managing material for a manufacturing line, comprising:

providing a vendor site just-in-time (VJIT) warehouse at a location proximate to but distinct from a manufacturing site of a manufacturer;

maintaining warehouse vendor-owned units of material at the VJIT warehouse for provisioning to a manufacturer for production of an end item by the manufacturer;

providing a manufacturing site just-in-time (MJIT) warehouse at the manufacturing site;

providing a buffer area at the MJIT warehouse for holding only vendor-owned units of material transferred from the VJIT warehouse in quantities less than an aggregate number of vendor-owned units of material held by the VJIT warehouse;

providing a manufacturing line inventory warehouse at the manufacturing site proximate to the buffer area for receiving vendor-owned units of material from the buffer area when the buffer area receives a parts issue request;

providing an inventory database including data identifying the vendor-owned units of materials held in the buffer area at the MJIT warehouse of the manufacturing site;

providing a materials management system, coupled to the inventory database, including a processor for issuing the parts issue requests for the vendor-owned material needed from the buffer area at the MJIT warehouse during manufacturing of the end item and querying the inventory database;

monitoring the quantity of vendor-owned units of material held by the buffer area by querying the inventory database from the VJIT warehouse through the materials management system;

replenishing the vendor-owned units of material in the buffer area when the monitored quantity of vendor-owned units of material held in the buffer area is below a predetermined level; and transferring ownership, in the materials management system, of the vendor-owned units of material to the manufacturer after receipt of the vendor-owned units of material by the manufacturing line inventory warehouse from the buffer area.

3. A program storage device, comprising:

program instructions executable by a processing device to perform operations for managing material for a manufacturing line, the operations comprising:

providing a vendor site just-in-time (VJIT) warehouse at a location proximate to but distinct from a manufacturing site;

maintaining at the VJIT materials owned by a vendor for provisioning to a manufacturer for production of an end item by the manufacturer;

providing a manufacturing site just-in-time (MJIT) warehouse at a manufacturing site of a manufacturer;

providing a buffer area at a manufacturing site just-in-time (MJIT) warehouse for holding only vendor-owned units of material transferred from the VJIT in quantities less than an aggregate number of units held by the vendor;

monitoring, by the VJIT, a quantity of vendor-owned units of material held by the buffer area;

replenishing vendor-owned units of material upon detection by the VJIT of units of material held in the buffer area below a predetermined level;

providing a manufacturing line inventory warehouse at the manufacturing site proximate to the buffer area for receiving vendor-owned units of material from the buffer area when the buffer area receives a parts issue request;

transferring ownership of the materials transferred to the manufacturer after receipt by the manufacturing line inventory warehouse of the vendor-owned units of material from the buffer area;

providing an inventory database including data identifying the vendor-owned units of materials held in the buffer area at the MJIT warehouse of the manufacturing site; and providing a materials management system, coupled to the inventory database, including a processor for issuing the parts issue requests for vendor-owned material needed from the buffer area at the MJIT warehouse during manufacturing of the end item.

* * * * *